(No Model.)
M. COLLINS.
COLLAR AND CUFF STARCHING MACHINE.
No. 555,210. Patented Feb. 25, 1896.
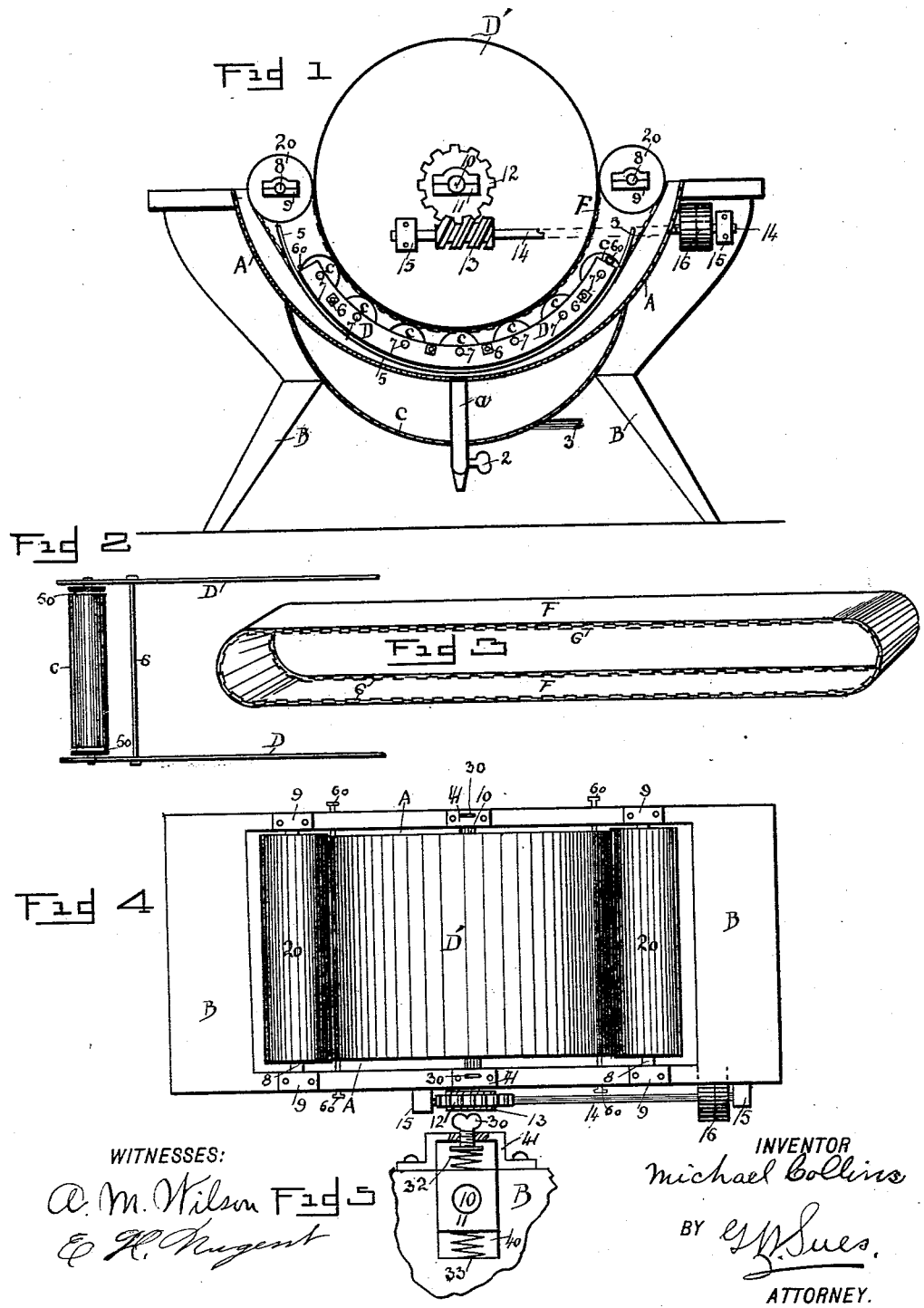
WITNESSES:
INVENTOR
Michael Collins
BY
ATTORNEY.

UNITED STATES PATENT OFFICE.

MICHAEL COLLINS, OF OMAHA, NEBRASKA.

COLLAR AND CUFF STARCHING MACHINE.

SPECIFICATION forming part of Letters Patent No. 555,210, dated February 25, 1896.

Application filed June 18, 1895. Serial No. 553,247. (No model.)

*To all whom it may concern:*

Be it known that I, MICHAEL COLLINS, residing at Omaha, in the county of Douglas and State of Nebraska, have invented certain useful Improvements in Collar and Cuff Starching Machines; and I do hereby declare that the following is a full, clear, and exact description of the invention, such as will enable others skilled in the art to which it appertains to make and use the same, reference being had to the accompanying drawings, which form a part of this specification.

This invention has relation to an improvement in collar and cuff starching machines.

The object of this invention is to provide a simple mechanical means by which collars, cuffs, and other small articles may be starched and at the same time leave the starcher in a flat, smooth, and unwrinkled condition ready to be placed in the ironing-machine.

In the accompanying drawings, Figure 1 shows a partly sectional view of a collar and cuff starcher embodying my invention, showing the main driving-gear in position, though the side of the starcher is removed. Fig. 2 is a top view of the cradle, showing one of the starching-rolls and one of the brace-rods in position. Fig. 3 shows a detached detail of the endless carrier as used in my invention. Fig. 4 shows a top view of my invention with the endless carrier removed and showing the terminal rolls. Fig. 5 shows an enlarged broken detached detail of the bearings adapted to support the shaft of the drum D'.

A represents a suitable semicylindrical trough, preferably of metal, which is supported within a suitable standard B. Secured below the trough A is a crescent-shaped chamber C which has a pipe 3 entering the same and is used as a steam-jacket to keep the starch within the trough A warm. The starch put within this trough may be drawn off by means of the pipe *a* and cock 2. (Shown in Fig. 1.)

Fixed within the trough A are two semicircular rails 5, one of them being shown in position in Fig. 1. Loosely resting upon these rails 5 is a segment-shaped frame, which frame comprises the two frame portions D D, which are united by a number of rods 6 and give support to a series of rolls *c*, one of these rolls and rods being shown in Fig. 2. These frame-pieces D D are removably held upon the rails 5. These rails 5 are simply segment-shaped strips of iron secured to the sides of the trough.

Transversely secured to the supporting-standard B are two journal-bearings 11 11, which give support to the shaft 10, which shaft supports a hollow, preferably fabric-covered, drum D'. This shaft 10 is provided at one end with a gearing 12 adapted to mesh with a worm 13, which worm is shown in position in Fig. 1, though the side of the starcher is removed to better show the arrangements of the instrumentalities. The shaft 14 carrying the worm is mounted within two bearings 15, and is provided with the pulleys 16 in belt connection with the driving-shaft.

Secured to the standard B are two sets of bearings 9 9 and giving support to two shafts 8 8, as is shown more clearly in Fig. 1. These shafts in turn give support to two rolls 20 20, which rolls work loosely within the bearings and give support to an endless apron F made of some open-woven fabric through which the starch can readily work. This apron works over the two rolls 20. The rolls *c* are provided with a groove 50 at each end, as is shown in Fig. 2, which groove is adapted to accommodate a chain G, to which chain is secured by any suitable means the open-woven endless fabric apron F. This apron passes below the series of rolls *c* which are mounted within the segment-shaped frame-pieces D below the lower part of the drum D' and between the rolls *c* and the drum, as is shown in Fig. 1.

The frame-pieces D and rollers *c* can be readily removed from the starching-machine by simply removing one set of the bearings 9, so as to get a sufficient slack in the endless apron to permit the removal of one of these terminal rolls 20. The frame-pieces D D are then drawn forward and can be readily cleaned. The parts are all readily accessible, which is of great convenience in a device of this sort in that it is necessary to keep the machine in a clean condition.

The bearing in which the shaft 10 revolves is shown in detail in Fig. 5 and comprises an ordinary boxing 11, which works within a slot of the standard B, as is clearly shown in Fig. 5, these bearings 11 working upon a suitable spring 33, held within a slot 40 of the standard B, and above are provided with an additional spring 32, upon which a set-screw 30 works, so that the drum D' by means of this set-screw 30 can be given a spring-tension and can be forced upon the endless apron F, which apron in turn, as has been stated, works over the series of rolls c c.

The machine is filled with a suitable quantity of starch, so that the lower portion of the terminal rolls 20 are within the starch, as are all the rolls c c. The collars, cuffs and other small articles to be starched are fed between the terminal roll 20 at the left-hand side of Fig. 1 and the drum D', which are brought snugly together, and as this drum D' revolves the article is straightened out and smoothed to remove the wrinkles and so feed into the starch. Before the article is carried between the drum D' and the first roll c the starch has a good chance to work onto the article, as the drum is all covered with the starch, until it reaches the first roll c, where the starch is squeezed out of the article. The article is again permitted to be covered with starch in going between the first and second rolls c and is again relieved of its surplus starch. This continues until the last roll c is encountered, which simply acts in guiding the lower portion of the endless apron F and does not squeeze or compress the article, the article being carried full of starch to the upper terminal roll 20, where the surplus starch is removed. The article is supposed to be removed at this side or, if desired, can again be carried around by the drum to go through a second working.

The starch is kept hot by means of a jet of steam which is permitted to enter the steam-chamber C, as is shown in the drawings. The movement of the drum, however, is so timed that but one-half of a revolution of the drum will sufficiently starch the article carried or placed into the machine.

To hold the rails D in position I provide two ordinary stops 60 60, which project from the inner sides of the starch-trough and so hold the rails in position.

Now, having thus described my said invention, what I claim as new, and desire to secure by United States Letters Patent, is—

1. In a starching-machine, the combination with a suitable standard, of a revolving drum mounted within said standard, a semicircular trough secured to said standard and adapted to encompass the lower portion of said drum, segment-shaped rails within said trough, a semicircular cradle removably held upon said rails, a series of rolls within said cradle, the first of said rolls being adapted to encounter said drum, the last of said rolls, however, receding from said drum, a terminal roll secured to the front of said standard and working against said drum at one side, and a second terminal roll transversely secured to said standard and working against the said drum upon the opposite side and an open, woven, endless apron passing over said terminal rolls and said series of rolls below the lower part of said drum all substantially as and for the purpose set forth.

2. In a collar and cuff starcher, the combination of a standard, B, the trough, A, the steam-chamber, C, the drum, D', mounted upon the shaft, 10, said shaft working within the spring-suspended bearings, 11, 11, the rails, 5, the segment-frame working upon said rails, the rolls, c, working within said frame and provided with the grooves, 50, the rolls, 20, 20, working adjacent to said drum, D', the endless open, fabric apron, F, provided with two guiding-chains, G, working within said grooves, 50, and the worm and pinion, 12 and 13, adapted to operate said shaft, 10, all substantially as and for the purpose set forth.

In testimony whereof I affix my signature in presence of two witnesses.

MICHAEL COLLINS.

Witnesses:
G. W. SUES,
G. P. BOLSER.